United States Patent [19]
Shin et al.

[11] Patent Number: 6,016,365
[45] Date of Patent: Jan. 18, 2000

[54] DECODER HAVING ADAPTIVE FUNCTION OF ELIMINATING BLOCK EFFECT

[75] Inventors: Tae Hwan Shin; Jong Nam Kim; Tae Sun Choi, all of Kwangju; Il Yoon, Koonpo-si, all of Rep. of Korea

[73] Assignee: Samsung Electro-Mechanics Co., Ltd., Rep. of Korea

[21] Appl. No.: 08/978,555

[22] Filed: Nov. 26, 1997

[30] Foreign Application Priority Data

Oct. 16, 1997 [KR] Rep. of Korea ........................ 97-53012

[51] Int. Cl.[7] ................................. G06K 9/36; G06K 9/46
[52] U.S. Cl. ........................ 382/233; 382/250; 382/268
[58] Field of Search .................................... 382/190, 191, 382/195, 199, 232, 233, 235, 236, 248, 250, 260, 268, 276, 283; 348/395, 402, 420, 415; 358/539, 426, 261.3, 432, 447, 458

[56] References Cited

FOREIGN PATENT DOCUMENTS 0781053  6/1997  European Pat. Off. .

OTHER PUBLICATIONS

Pennebaker and Mitchell, "JPEG still image data compression standard", Van Nostrand Reinhold, N.-Y., pp. 261–263, 1993.

Russ, "The image processing handbook", 2nd ed., CRC Press, Inc., pp. 37 and 238, 1995.

*Primary Examiner*—Phuoc Tran
*Attorney, Agent, or Firm*—Webb Ziesenheim Logsdon Orkin & Hanson, P.C.

[57] ABSTRACT

A decoder having an adaptive function of eliminating block effect in consideration of the contents of an image includes a buffer for storing a compressed signal coming at a fixed bit rate; a variable length decoder (VLD) for variable length decoding an output signal of the buffer to thereby output a motion vector signal and a quantized signal of spatial frequency; an 8*8 reverse quantizer for reversely quantizing the quantized signal of spatial frequency; a block effect deciding portion for determining whether there is a need for spatial frequency presumption or not; a border detector for deciding the border of object in a spatial frequency area; an adaptive low spatial frequency predictor for adaptively presuming the spatial frequency component, whether the current block is present at the border of object; an 8*8 reverse DCT transformer for converting a spatial frequency signal into a signal of pixel area; a motion compensator for compensating for motion using a motion vector signal; and a frame memory for storing the signal of pixel area output from the reverse DCT transformer.

12 Claims, 8 Drawing Sheets

| DC1 | DC2 | DC3 |
|-----|-----|-----|
| DC4 | DC5 | DC6 |
| DC7 | DC8 | DC9 |

FIG. 5 (Prior Art)

|   |   |   |
|---|---|---|
| 1 | 1 | 1 |
| 0 | 0 | 0 |
| -1 | -1 | -1 |

|   |   |   |
|---|---|---|
| -1 | -1 | -1 |
| 0 | 0 | 0 |
| 1 | 1 | 1 |

|   |   |   |
|---|---|---|
| 1 | 0 | -1 |
| 1 | 0 | -1 |
| 1 | 0 | -1 |

|   |   |   |
|---|---|---|
| -1 | 0 | 1 |
| -1 | 0 | 1 |
| -1 | 0 | 1 |

DECODER HAVING ADAPTIVE FUNCTION OF ELIMINATING BLOCK EFFECT

FIELD OF THE INVENTION

The present invention relates to a decoder for a system which compressively encodes and decodes an image using discrete cosine transform (DCT). More particularly, this invention pertains to a decoder having an adaptive function of removing block effect, in which the screen contains mosaics, by presuming information lost during heavy compression or transmission, for the purpose of providing better quality of picture.

BACKGROUND OF THE INVENTION

Communications systems are in the stage of transmission of image as well as simple characters or voice information. For its storage or transmission, video information inevitably requires compression because of its huge amount of information, unlike the information of voice or characters. Among the international standards for the compression of image are joint picture experts group (JPEG) for still pictures, moving picture experts group-1 (MPEG-1) for moving pictures, and moving picture experts group-2 (MPEG-2) for digital TV or HDTV. Together with those, other standards are under way.

Video information is generally duplicate, and video compression is designed to remove this redundancy. A still image roughly involves spatial and statistical redundancies. A moving picture contains temporal redundancy besides the two. For the spatial redundancy, compression is carried out using DPCM or DCT and quantization because spatially nearby pixels have similar values in digital video information. Secondly, the statistical redundancy has compression by allocating a short sign for statistically frequent values and a long sign for statistically rare. Finally, for temporal redundancy, compression is performed by replacing the value of a current picture with the previous because temporally nearby pictures contain similar values except the case where screen conversion occurs.

Those video compression standards essentially include DCT transform. In the original pixel areas video information is widely spread. When the information at the pixel area is DCT transformed, it is converted into spatial frequency area, causing the energy compaction where video information is crowded into the DC value (the mean of image at the pixel area) and low-band frequencies. According to the human visual system (HVS), in the spatial frequency, people are sensitive to the DC value and low-band frequencies but not to high-band frequencies. Therefore, when light quantization is performed in the DC value and low-band frequencies but heavy quantization in the high-band frequencies, compression can be obtained without difference of video quality sensed by people. Among various conversions, the DCT has been suggested as the best in the energy compaction.

FIG. 1 is a block diagram of an encoder of MPEG-2, one of the video standards including DCT transform. Referring to this drawing, there will be described below the compression procedure for input image in the existing encoder, and its drawbacks.

First of all, the intraframe coding construction in the existing encoder includes a first frame memory 11 for storing video signals by frames, an 8*8 pixel divider (not shown) for dividing the video signal stored in first frame memory 11 into 8*8 blocks, an 8*8 DCT transformer 12 for performing DCT transform to the difference between the video signal divided into 8*8 pixel blocks and an output signal of a motion compensator 20 for the purpose of the conversion of the spatial frequency area from pixel area, an 8*8 quantizer 13 for quantizing the signal converted into the spatial frequency area, a variable length coder (VLC) 14 for VLC-coding the signal quantized, a buffer 15 for storing the coded signal in order to send it to a multiplexer at a fixed bit rate, an 8*8 reverse quantizer 16 for reversely quantizing the signal quantized, an 8*8 reverse DCT transformer 17 for converting the reversely quantized signal of the spatial frequency into pixel area, a second frame memory 18 for recovering and storing a decoded image from the output signal of 8*8 reverse DCT transformer 17, a motion predictor 19 for finding motion information between the current and previous images, and the motion compensator 20 for compensating for the motion information detected by motion predictor 19.

As stated above, the conventional video encoder using DCT transform divides a video signal into 8*8 blocks, and signals passing through the 8*8 reverse DCT transformer are compressed through the 8*8 quantizer. However, the 8*8 blocks each have different energy compactions and quantization values in the 8*8 quantizer. For this reason, the output signals of the quantizer contain different values for the respective blocks, involving block effect.

Figure 1:
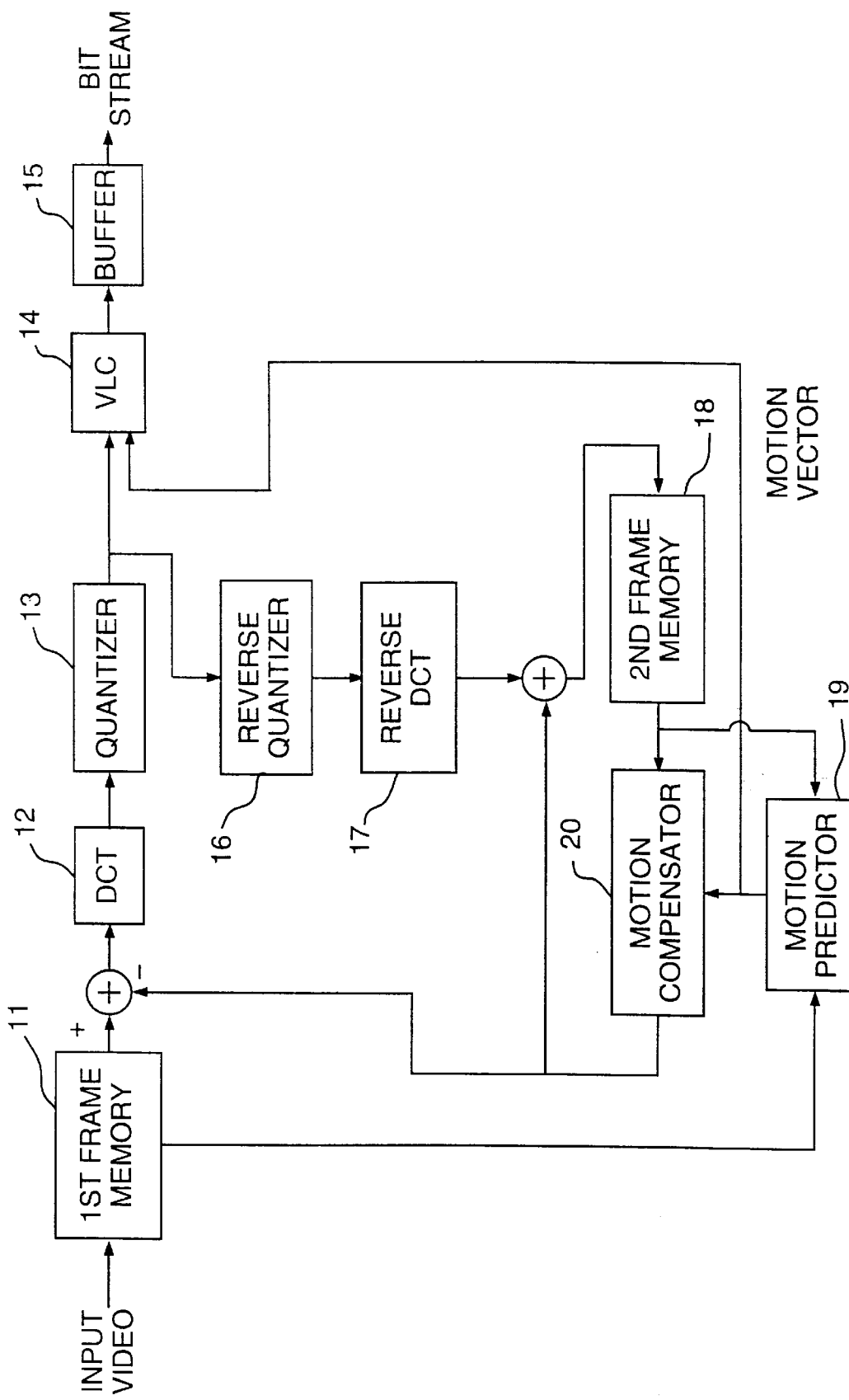

A conventional decoder includes a buffer 31 for storing a compressed signal coming at a fixed bit rate, a variable length decoder (VLD) 32 for variable length decoding the output signal of buffer 31 to thereby output a motion vector signal and a quantized signal of spatial frequency, an 8*8 reverse quantizer 33 for reversely quantizing the quantized signal of spatial frequency, an 8*8 reverse DCT transformer 34 for converting the spatial frequency signal into a signal of pixel area, a motion compensator 35 for compensating for motion using a motion vector signal, and a frame memory 36 for storing the signal of pixel area output from the reverse DCT transformer.

Figure 4:
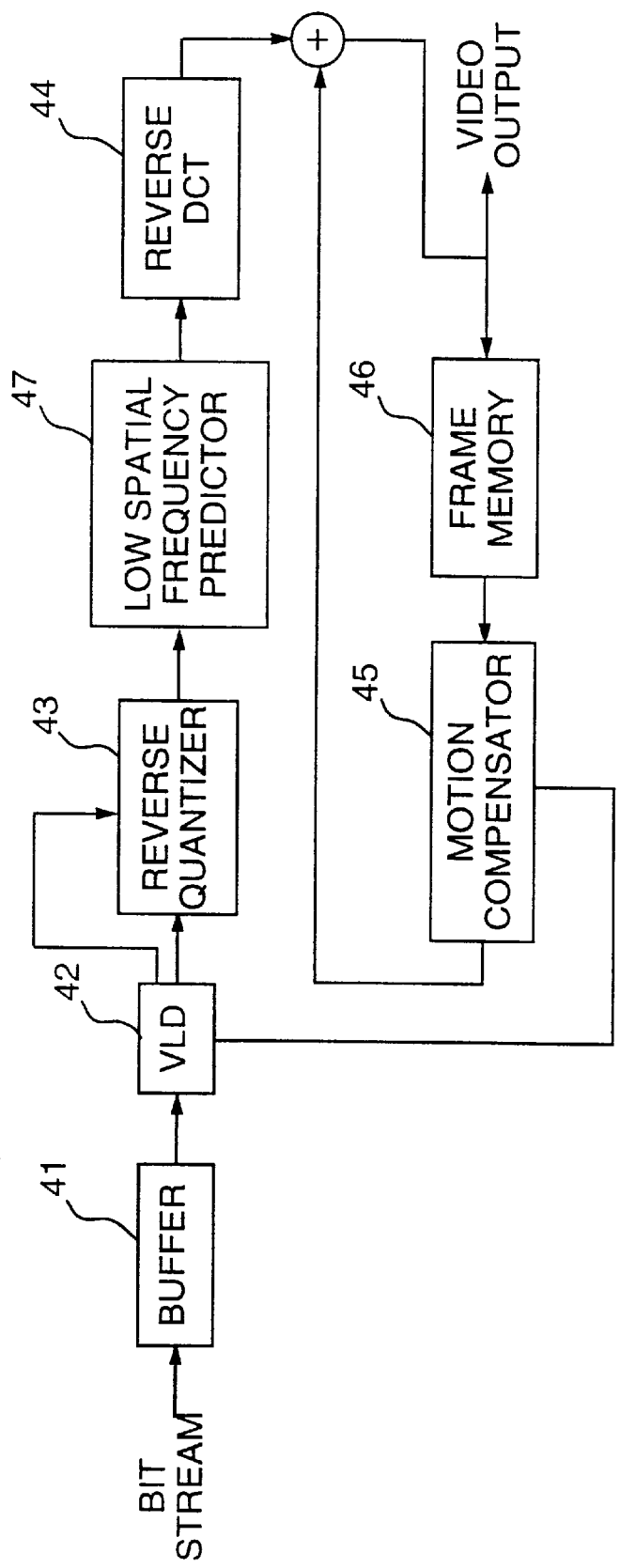

FIG. 4 is a block diagram of a conventional decoder for removing block effect. Referring to this drawing, the procedure of eliminating block effect will be explained below.

The decoder includes a buffer 41 for storing a compressed signal coming at a fixed bit rate, a VLD 42 for variable length decoding the output signal of buffer 41 to thereby output a motion vector signal and a quantized signal of spatial frequency, an 8*8 reverse quantizer 43 for reversely quantizing the quantized signal of spatial frequency, a low spatial frequency predictor 47 for presuming five low spatial frequency components, an 8*8 reverse DCT transformer 44 for converting the spatial frequency signal into a signal of pixel area, a motion compensator 45 for compensating for motion using a motion vector signal, and a frame memory 46 for storing the signal of pixel area output from the reverse DCT transformer 44.

Figure 5:
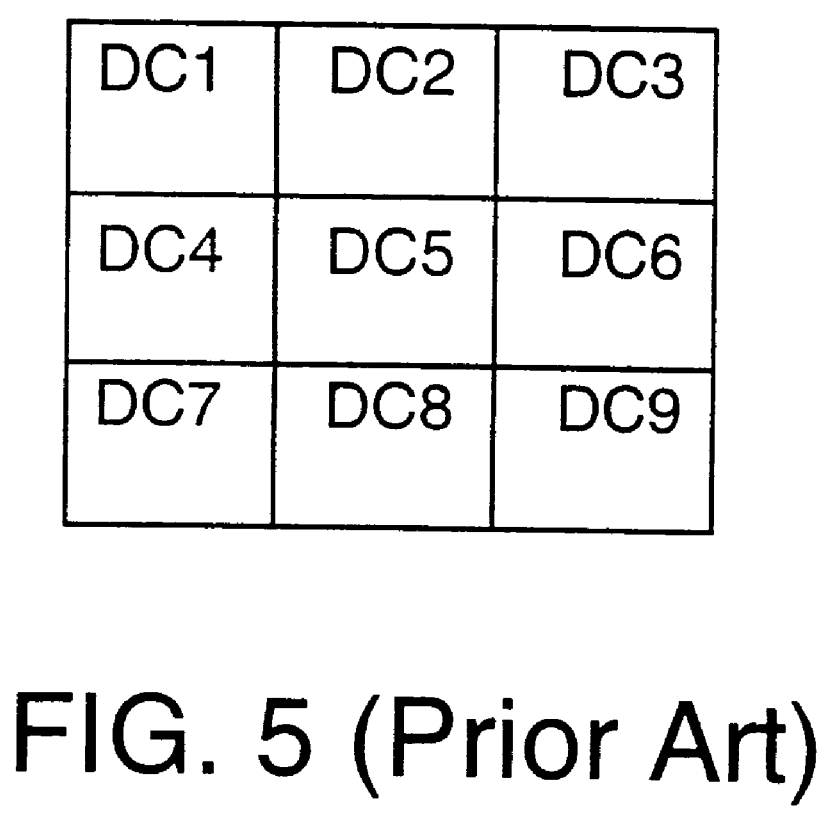

FIG. 5 shows the position of blocks used in predicting low spatial frequency, including a block whose low spatial frequency component is presumed, and its nearby blocks used in this process. In this drawing, the current block whose low spatial component is to be predicted is the fifth block, and its DC component is indicated as DC5. Other values in FIG. 5, such as DC1, represent the DC values of nearby blocks used in the procedure.

Referring to FIG. 5, the prediction of low spatial frequency, which substantially removes the block effect, is obtained with expression 1 in which AC(x,y) indicates the frequency component value corresponding to the position of (x,y) in the 8*8 spatial frequency area.

Expression 1

$$AC_5(0,1)=1.13885*(DC_4-DC_6)/8$$

$$AC_5(1,0)=1.13885*(DC_2-DC_8)/8$$

$$AC_5(2,0)=0.27881*(DC_2+DC_8-2*DC_5)/8$$

$$AC_5(1,1)=0.16213*(DC_1+DC_9-DC_3-DC_7)/8$$

$$AC_5(0,2)=0.27881*(DC_4+DC_6-2*DC_5)/8$$

Figure 6:

FIG. 6 shows an example of the output image by the conventional block effect removing decoder, explaining the drawbacks of the conventional spatial frequency component predictor. This decoder assumes the spatial frequency component regardless of the contents of image, deteriorating the quality of picture with a complicated image or at the border of objects in the picture. This problem is deemed serious because it occurs at borders where people are very sensitive.

SUMMARY OF THE INVENTION

Therefore, in order to overcome such drawbacks of the prior art, an objective of the present invention is to provide a decoder having an adaptive function of removing block effect, which adaptively eliminates the block effect caused by the encoder in consideration of the contents of image, to thereby obtain better quality of picture.

To accomplish the objective of the present invention, there is provided a decoder having an adaptive function of eliminating block effect caused during video compressive coding in consideration of the contents of an image, the decoder comprising: a buffer for storing a compressed signal coming at a fixed bit rate; a variable length decoder (VLD) for variable length decoding an output signal of the buffer to thereby output a motion vector signal and a quantized signal of spatial frequency; an 8*8 reverse quantizer for reversely quantizing the quantized signal of spatial frequency; a block effect deciding portion for determining whether there is a need for spatial frequency presumption or not; a border detector for deciding the border of object in a spatial frequency area; an adaptive low spatial frequency predictor for adaptively presuming the spatial frequency component, whether the current block is present at the border of object or not; an 8*8 reverse DCT transformer for converting a spatial frequency signal into a signal of pixel area; a motion compensator for compensating for motion using a motion vector signal; and a frame memory for storing the signal of pixel area output from the reverse DCT transformer.

BRIEF DESCRIPTION OF THE ATTACHED DRAWINGS

Figure 2:
FIG. 2 shows an example of block effect caused by the conventional encoder. As in this picture, the block effect indicates a phenomenon in which the screen appears like mosaic.
Figure 10:
Figure 3:
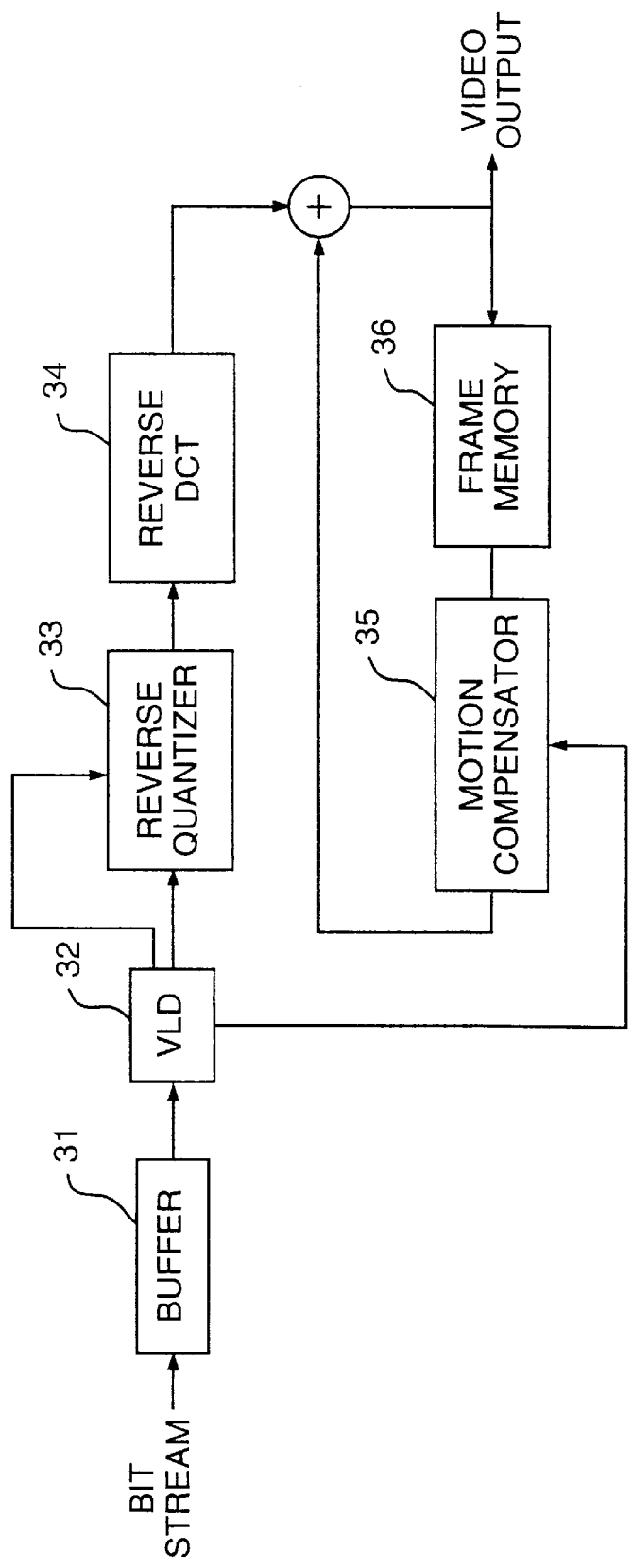
FIG. 3 is a block diagram of a conventional decoder of MPEG-2, one of the video compression standards using DCT transform. With FIG. 3, a procedure of decoding an encoded signal into a video signal will be explained below.
Figure 7:
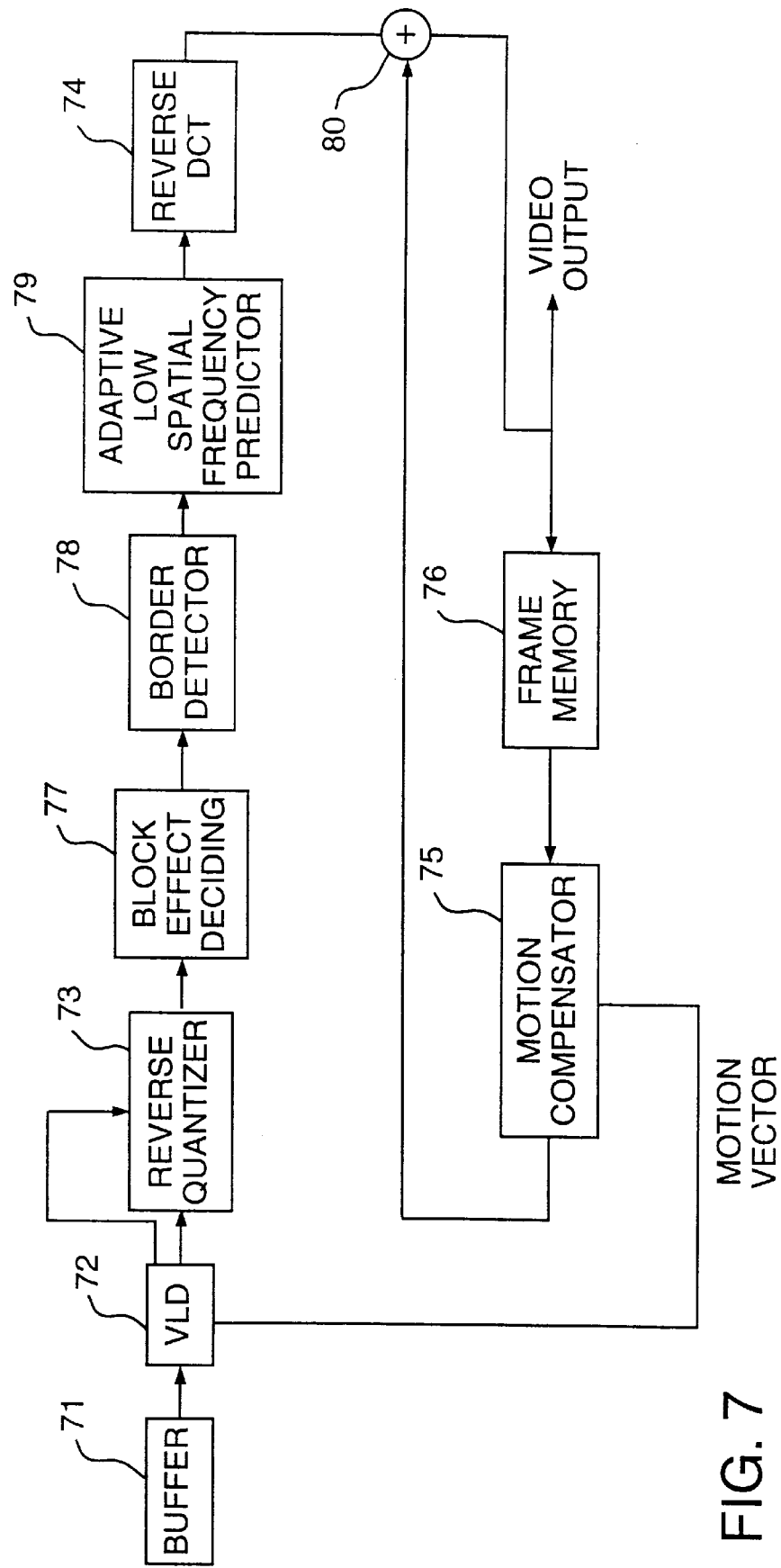
Figure 9:
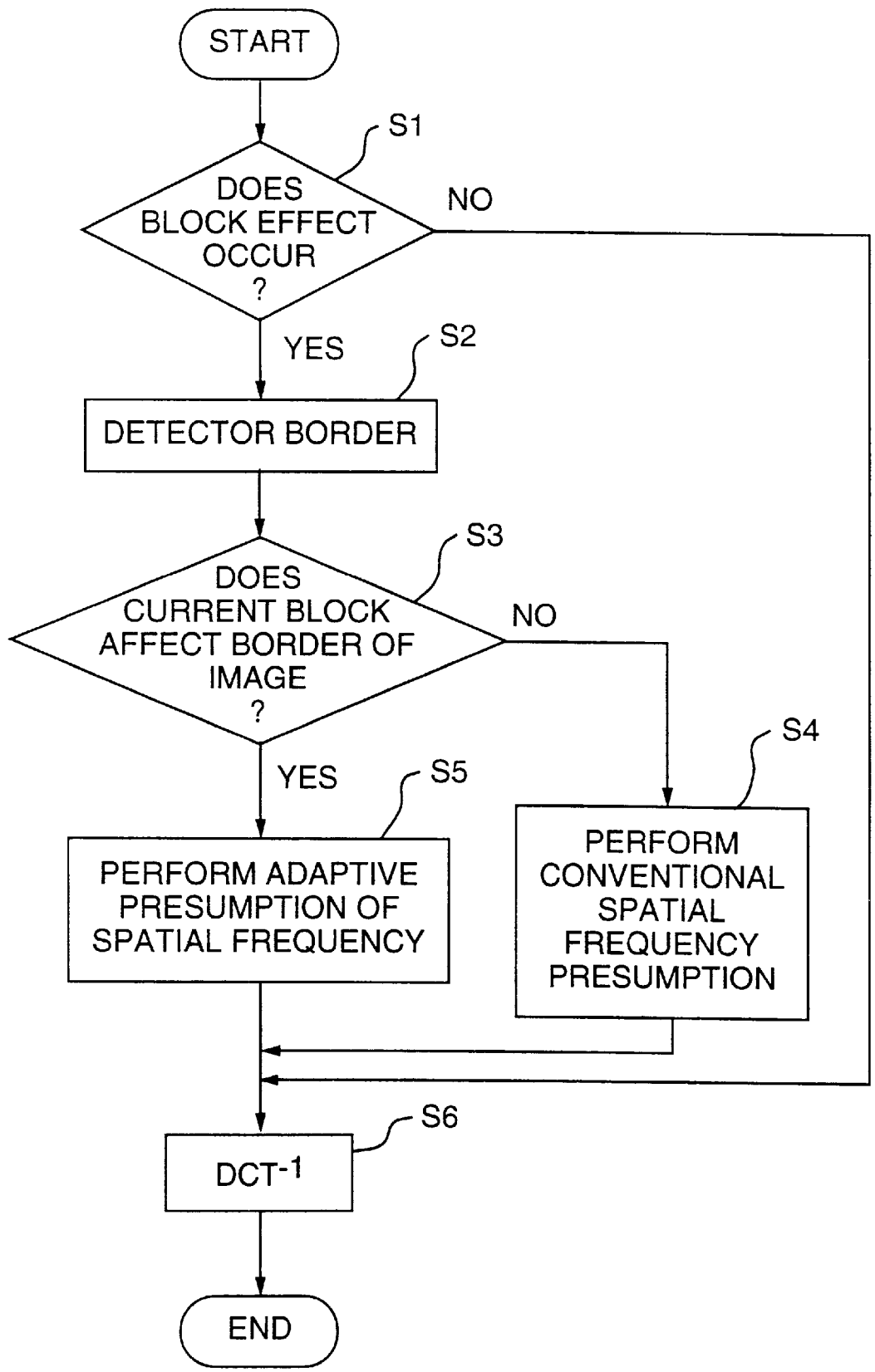

These and other features of the invention will be understood more clearly from the following description, read in conjunction with the drawings, in which:

FIG. 1 is a block diagram of a conventional encoder of MPEG-2, one of video compression standards, including DCT transform;

FIG. 2 is an example of a block effect caused by the encoder of FIG. 1;

FIG. 3 is a block diagram of a conventional decoder of MPEG, one of the video compression standards, using DCT transform;

FIG. 4 is a block diagram of a conventional decoder for removing the block effect;

FIG. 5 shows the positions of blocks used to predict low spatial frequency in FIG. 4;

FIG. 6 is an example of the output image by the conventional decoder shown in FIG. 4;

FIG. 7 is a block diagram of a decoder of the present invention having an adaptive function of eliminating block effect;

FIGS. 8A–8D show compass masks used for the border detection in four directions, north, east, west, and south;

FIG. 9 is a flowchart for explaining a decoding method for adaptively eliminating block effect according to the present invention; and FIG. 10 is an example of the output image from the adaptive decoder of the present invention.

DETAILED DESCRIPTION OF THE INVENTION

Hereinafter, a preferred embodiment of the present invention will be described with reference to the attached drawings.

Referring to FIG. 7, a decoder having an adaptive function of removing block effect further comprises a block effect deciding portion 77 for determining whether the spatial frequency prediction is necessary or not, and a border detector 78 for deciding the border of objects in the spatial frequency area, compared with the construction of the conventional decoder. In addition, the spatial frequency predictor of FIG. 4 is replaced with an adaptive low spatial frequency predictor 79 for adaptively presuming spatial frequency component, whether the current block is present at the border of objects or not.

Similar to that shown in FIG. 4, the decoder of the present invention includes a buffer 71 for storing a compressed signal coming at a fixed bit rate, a VLD 72 for variable length decoding the output signal of buffer 71 to thereby output a motion vector signal and a quantized signal of spatial frequency, an 8*8 reverse quantizer 73 for reversely quantizing the quantized signal of spatial frequency, an 8*8 reverse DCT transformer 74 for converting the spatial frequency signal into a signal of pixel area, a motion compensator 75 for compensating for motion using a motion vector signal, and a frame memory 76 for storing the signal of pixel area output from the reverse DCT transformer.

The newly added block effect deciding portion 77 determines whether to presume spatial frequency, by adding the number, not zero, of spatial frequency component to the output signal of the reverse quantizer. Border detector 78 forms DC image in the spatial frequency area, not through pixel area conversion, according to expression 2. According to this equation, the DC value is divided by 8 to obtain the mean of 8*8 blocks because the DC value in the spatial frequency area is eight times the mean of 8*8 blocks in the pixel area. Border detector 78 detects the border of the thus obtained DC image, using expression 3 and FIGS. 8A–8D. FIGS. 8A–8D show compass masks used for border detection in four directions, north, south, west, and east. In the results of expression 3, the block surpassing the threshold is determined as border.

Expression 2

$$DC = DCT(0,0) = \frac{1}{4}C(0)C(0)\sum_{i=0}^{7}\sum_{j=0}^{7}f(i,j)$$

$$= \frac{1}{8}\sum_{i=0}^{7}\sum_{j=0}^{7}f(i,j)$$

Expression 3

$$\langle U, H \rangle = \sum_{i}\sum_{j} h(i,j)u(i+m, J+n)$$

In Expression 2, DC is the average value of the pixels in the 8*8 blocks, DCT(0.0) is the AC value at location (0,0) in the reversely quantized 8*8 blocks, C(0) is a coefficient, i and j are the position of the pixels in the pixel area, f(i,j) is a value of the pixel at location (i,j). In Expression 3, U represents a pixel value, H represents a mask value, i and j indicate a position in the 3*3 compass mask, h(i,j) is the mask value at the (i,j) position, U(i,j) is the pixel value at the (i,j) position and m and n indicate a current position of the image.

The adaptive spatial frequency deciding circuit 79, changed from the conventional spatial frequency detector, presumes, on basis of the output signal of border detector 78, the spatial frequency component according to expression 1 when the current block is not present around the border of object. When the current block is placed at the border of object or at a position affecting the border, the spatial frequency component is presumed after the DC value of the block placed at a position affecting the border is replaced with the DC value of the current block, according to a modification of expression 1.

For instance, if blocks 1, 4, 7 exist around the border, expression 1 is replaced with expression 4.

Expression 4

$$AC_5(0,1)=1.13885*(DC_5-DC_6)/8$$

$$AC_5(1,0)=1.13885*(DC_2-DC_8)/8$$

$$AC_5(2,0)=0.27881*(DC_2+DC_8-2*DC_5)/8$$

$$AC_5(1,1)=0.16213*(DC_9-DC_3)/8$$

$$AC_5(0,2)=0.27881*(DC_6-DC_5)/8$$

Referring to FIG. 9 showing a flowchart for explaining the operation of the decoder of the present invention, it is determined in step S1 whether the spatial frequency component of the output signal of the reverse quantizer need to be presumed or not. If there is no need for spatial frequency presumption, the output signal goes as the input signal of the reverse DCT transformer. If the spatial frequency presumption is required, it is detected in step S2 whether the current block is present at the border. It is determined in step S3 whether the existing spatial frequency component presumption affects the border of image. If not, the existing spatial frequency component presumption is performed in step S4, and then the resultant signal is entered as the input signal of the reverse DCT transformer. If the existing spatial frequency presumption affects the border of image, the signal goes as the input signal of the reverse DCT transformer through the newly adopted adaptive spatial frequency component presumption in step S5.

Turning to FIG. 10, the adaptive decoder of the present invention prevents the border of object from being deteriorated during the procedure of removing block effect and sharply reduces the block effect with uniformity of object, by performing the spatial frequency presumption in consideration of the border of the current object, contrary to the conventional presumption that is regularly carried out regardless of the contents of image.

As described above, the decoder of the present invention is capable of recovering a good quality of image by removing the block effect in consideration of the contents of the image as well as reducing the affect between objects.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. A decoding system having an adaptive function of eliminating block effect caused during video compressive coding in accordance with an image object, the decoder comprising:

a variable length decoder (VLD) for variable length decoding a compressed signal to output a motion vector signal and a quantized signal of spatial frequency having a DC component and an AC component;

an 8*8 reverse quantizer for reversely quantizing the quantized signal of spatial frequency;

a block effect detecting unit for detecting block effect of an image object;

a border detecting unit for detecting a bordering block of the block effected-image object in a spatial frequency area to presume the AC component;

an adaptive low spatial frequency predictor for adaptively presuming the value of the AC components of the current block by replacing the value of the DC component of the bordering block with the value of the DC component of the current block and calculating the replaced value of the DC component of the current block in a case where the current block is affected by the bordering block and by calculating the value of the DC components around the current block in a case where the current block is not affected by the bordering block;

an 8*8 reverse DCT transformer for converting the signal having DC component and AC component in a spatial frequency area into a signal of pixel area;

a motion compensator for compensating for motion using a motion vector signal; and a frame memory for storing the signal of pixel area from the reverse DCT transformer.

2. The decoding system as claimed in claim 1, wherein the block effect detecting unit adds the number of the AC components except components having the value of zero in the spatial frequency area to detect the block effect of the image object.

3. The decoding system as claimed in claim 1, wherein the border detecting unit generates a DC image of an array of 8*8 blocks in the reversely quantized spatial frequency area according to the following expression (2)

$$DC = DCT(0,0) = \frac{1}{4}C(0)C(0)\sum_{i=0}^{7}\sum_{j=0}^{7} f(i,j) \quad (2)$$

$$= \frac{1}{8}\sum_{i=0}^{7}\sum_{j=0}^{7} f(i,j)$$

where DC is the average value of pixels in the 8*8 blocks, DCT(0,0) is the AC value at (0.0) in the reversely quantized 8*8 blocks, C(0) is a coefficient, i and j are the position of the pixels in the pixel area, f(i,j) is a value of the pixel at (i,j).

4. The detecting system as claimed in claim 3, wherein the border detecting unit detects the border of the image object by using 3*3 compass masks in the reversely quantized 8*8 blocks and defining the relationship between a pixel value U and a mask value H as the following expression (3)

$$\langle U, H \rangle = \sum_{i=0}^{2}\sum_{j=0}^{2} h(i,j)u(i+m, j+n) \quad (3)$$

where i and j indicate position in the 3*3 compass mask, h(i,i) is mask value at (i,j) position, u(i,i) is the pixel value at (i,j) position, and m and n indicate the current position of the image.

5. The decoding system as claimed in claim 4, wherein the border detecting unit determines a block as a border when the results of the expression (3) is larger than a threshold.

$$\langle U, H \rangle = \sum_{i=0}^{2}\sum_{j=0}^{2} h(i,j)u(i+m, J+n)$$

6. The decoding system as claimed in claim 1 wherein the adaptive spatial frequency predictor presumes AC values of the current block according to the following expression (4) in case where the current block does not include the border of the image object $$AC_5(0,1)=1.13885*(DC_4-DC_6)/8$$

$$AC_5(1,0)=1.13885*(DC_2-DC_8/8$$

$$AC_5(2,0)=0.27881*(DC_2+DC_8-2*DC_5)/8$$

$$AC_5(1,1)=0.16213*(DC_1+DC_9-DC_3-DC_7)/8$$

$$AC_5(0,2)=0.27881*(DC_4+DC_6-2*DC_5)/8 \quad (4)$$

where AC(x,y) is the AC component of the current block, $DC_n$ is the DC component around the current block in the DCT region, and x and y are the position of the AC component.

7. The decoding system as claimed in claim 1 wherein the adaptive spatial frequency predictor presumes the AC values of the current block by replacing the DC value of the bordering block with the DC value of the current block corresponding to the following expression (5) in case where the current block includes the bordering block of the image object, $$AC_5(0,1)=1.13885*(DC_4-DC_6)/8$$

$$AC_5(1,0)=1.13885*(DC_2-DC_8)/89$$

$$AC_5(2,0)=0.27881*(DC_2+DC_8-2*DC_5)/8$$

$$AC_5(1,1)=0.16213*(DC_1+DC_9-DC_3-DC_7)/8$$

$$AC_5(0,2)=0.27881*(DC_4+DC_62*DC_5)/8 \quad (5)$$

where AC(x,y) is the AC component of the current block, $DC_n$ is the DC component around the current block in the DCT region, and x and y are the position of the AC component.

8. A decoding method of adaptively removing block effect caused during video compressive coding in consideration of the contents of an image, the method comprising the steps of:

(1) deciding whether there is a need for presuming a spatial frequency component of a reversely quantized signal;

(2) performing reverse DCT transform if there is no need for spatial frequency presumption in step (1);

(3) detecting whether a current block is present at a border, if the spatial frequency presumption is required in step (1);

(4) if the border of an image is not affected in the step (3), performing the spatial frequency presumption according to the following expression, and then performing reverse DCT transform of the step (2)

$$AC_5(0,1)=1.13885*(DC_4-DC_6)/8$$

$$AC_5(1,0)=1.13885*(DC_2-DC_8)/8$$

$$AC_5(2,0)=0.27881*(DC_2+DC_8-2*DC_5)/8$$

$$AC_5(1,1)=0.16213*(DC_1+DC_9-DC_3-DC_7)/8$$

$$AC_5(0,2)=0.27881*(DC_4+DC_6-2*DC_5)/8$$

where AC(x,y) is the AC component of the current block, $DC_n$ is the DC component around the current block in the DCT region, and x and y are the position of the AC component; and (5) if the border of image is affected in step (3), performing the spatial frequency presumption by replacing the DC value of the block placed at a position affecting the border with the DC value of the current block, according to the following expression, and then performing reverse DCT transform of step (2);

$$AC_5(0,1)=1.13885*(DC_4-DC_6)/8$$

$$AC_5(1,0)=1.13885*(DC_2-DC_8)/8$$

$$AC_5(2,0)=0.27881*(DC_2+DC_8-2*DC_5)/8$$

$$AC_5(1,1)=0.16213*(DC_1+DC_9-DC_3-DC_7)/8$$

$$AC_5(0,2)=0.27881*(DC_4+DC_6-2*DC_5)/8.$$

9. A decoding system for decoding the compressed image signal, the system comprising:

a decoding unit for decoding the compressed image signal to output a quantized signal having DC component and AC component in a spatial frequency area and quantizing reversely the signal into the 8*8 block signal;

means for detecting block effect of the image object;

a border detecting means for detecting a bordering block of the block effect image object in a spatial frequency area to presume the AC component;

a means for presuming adaptively the value of the AC components of the current block by replacing the value of the DC component of the bordering block with the value of the DC component of the current block and calculating the replaced value of the DC component of the current block in case where the current block is affected by the bordering block and by calculating value of the DC components around the current block in case where the current block is not affected by the bordering block;

an 8*8 reverse DCT transforming unit for converting the signal having DC component and AC component in a spatial frequency area into a signal of pixel area; and a means for storing the signal of pixel area from the reverse DCT transforming unit.

10. A decoding method of adaptively removing block effect caused during video compressive coding in accordance with an image object, the method comprising the steps of:

(1) detecting block effect of the reversely quantized signal having DC component and AC component of an image object;

(2) DCT transforming reversely the quantized signal;

(3) detecting a current block including a bordering block of the image object to presume the value of AC components of the current block in spatial frequency area, the spatial frequency area defining the variation of the pixel value per space;

(4) presuming the value of the AC component of the current block by replacing the value of the DC component of the bordering block with the value of the DC component of the current block and calculating the replaced value of the DC component of the current block, and then DCT transforming reversely the values of the AC and DC components of the current block in the spatial frequency area, in case where there is the current block including the bordering block of the image object in step (3); and (5) presuming the value of the AC component of the current block by calculating the value DC component of the blocks around the current block and then DCT transforming reversely the values of the AC and DC components of the current block in the spatial frequency are, in case where there is no the current block including the bordering block of the image object in step (3).

11. The method as claimed in claim 10, wherein the replaced value of the DC component of the current block in step (4) is calculated by the following expression:

$$AC_5(0,1)=1.13885*(DC_4-DC_6)/8$$

$$AC_5(1,0)=1.13885*(DC_2-DC_8)/8$$

$$AC_5(2,0)=0.27881*(DC_2+DC_8-2*DC_5)/8$$

$$AC_5(1,1)=0.16213*(DC_1+DC_9-DC_3-DC_7)/8$$

$$AC_5(0,2)=0.27881*(DC_4+DC_6-2*DC_5)/8$$

where AC(x,y) is the AC component of the current block, $DC_n$ is the DC component around the current block in the DCT region, and x and y are the position of the AC component.

12. The method as claimed in claim 10, wherein the value DC component of the blocks around the current block is calculated by the following expression:

$$AC_5(0,1)=1.13885*(DC_4-DC_6)/8$$

$$AC_5(1,0)=1.13885*(DC_2-DC_8)/8$$

$$AC_5(2,0)=0.27881*(DC_2+DC_8-2*DC_5)/8$$

$$AC_5(1,1)=0.16213*(DC_1+DC_9-DC_3-DC_7)/8$$

$$AC_5(0,2)=0.27881*(DC_4+DC_6-2*DC_5)/8$$

where AC(x,y) is AC component of the current block, $DC_n$ is DC component around the current block in the DCT region, and x and y are position of the AC component.

* * * * *

UNITED STATES PATENT AND TRADEMARK OFFICE
CERTIFICATE OF CORRECTION

PATENT NO. : 6,016,365
DATED : January 18, 2000
INVENTOR(S) : Tae Hwan Shin et al.

It is certified that error appears in the above-identified patent and that said Letters Patent is hereby corrected as shown below:

Column 7 Line 25, Claim 4, "h(i,i)" should read --h(i,j)--.

Column 7 Line 25, Claim 4, "u(i,i)" should read --u(i,j)--.

Column 7 Lines 32-34, Claim 5, after "threshold." delete formula.

Column 7 Line 43, Claim 6, after "$DC_8$" insert --)--.

Column 7 Line 63, Claim 7, "/89" should read --/8--.

Column 8 Line 1, Claim 7, "$DC_62$" should read --$DC_6$-2--.

Column 10 Line 2, Claim 10, after "there is no" delete --the--.

Signed and Sealed this

Second Day of January, 2001

Attest:

Q. TODD DICKINSON

*Attesting Officer*    *Commissioner of Patents and Trademarks*